United States Patent [19]

Moll et al.

[11] Patent Number: 4,712,723

[45] Date of Patent: Dec. 15, 1987

[54] METHOD FOR BONDING AN INSULATED WIRE ELEMENT ON A CONTACT

[75] Inventors: Helmut Moll, Erlangen; Gerd Wiegel, Langenzenn; Josef Schindler, Regensburg; Wilfried Scherer, Rieden; Kurt Marth, Regensburg, all of Fed. Rep. of Germany

[73] Assignee: Siemens Aktiengesellschaft, Berlin and Munich, Fed. Rep. of Germany

[21] Appl. No.: 851,839

[22] Filed: Apr. 14, 1986

[30] Foreign Application Priority Data

Apr. 15, 1985 [DE] Fed. Rep. of Germany ....... 3513436

[51] Int. Cl.[4] .............................................. B23K 21/00

[52] U.S. Cl. .................................... 228/111; 156/73.2

[58] Field of Search ....................... 228/110, 111, 175; 29/602, 605, 606; 336/192, 196; 156/73.2, 280, 305

[56] References Cited

U.S. PATENT DOCUMENTS

| | | | |
|---|---|---|---|
| 3,271,717 | 9/1966 | Gilbert | 336/192 |
| 3,359,520 | 12/1967 | Foerster | 336/192 |
| 3,507,039 | 4/1970 | Craige | 29/606 |
| 3,590,207 | 6/1971 | Cox | 219/85 |
| 3,659,336 | 5/1972 | Horne | 29/608 |
| 3,708,878 | 1/1973 | Mann, Sr. et al. | 29/628 |
| 3,822,465 | 7/1974 | Frankort et al. | 228/111 |
| 4,002,282 | 1/1977 | Murdoch | 228/18 |
| 4,155,499 | 5/1979 | Denslow | 228/111 |
| 4,291,292 | 9/1981 | Witchger | 336/192 |
| 4,406,059 | 9/1983 | Scott et al. | 228/208 |
| 4,507,637 | 3/1985 | Hayashi | 336/192 |
| 4,595,901 | 6/1986 | Yahagi | 336/192 |

FOREIGN PATENT DOCUMENTS

| | | |
|---|---|---|
| 1194945 | 2/1966 | Fed. Rep. of Germany . |
| 1903006 | 8/1970 | Fed. Rep. of Germany . |
| 2641508 | 9/1978 | Fed. Rep. of Germany . |
| 2728914 | 1/1979 | Fed. Rep. of Germany . |
| 2757038 | 7/1979 | Fed. Rep. of Germany . |
| 3307773 | 9/1984 | Fed. Rep. of Germany . |
| 3433692 | 12/1984 | Fed. Rep. of Germany . |
| 2102632 | 2/1983 | United Kingdom . |

OTHER PUBLICATIONS

U.S. Ser. No. 761,788 Marth et al.

*Primary Examiner*—M. Jordan
*Attorney, Agent, or Firm*—Mark H. Jay

[57] ABSTRACT

A method for bonding a lacquer insulated wire to a metallic support is disclosed. The method is carried out in two steps: First, the wire is exposed to ultrasonic energy so that the lacquer is broken up and the wire is deformed in a certain area and welded to the support. Then the entire area of deformation is enclosed with a thixotropic adhesive. In preferred embodiments, the method is used for bonding the winding wire of a HF-inductor coil with contact elements shaped as wires or lugs.

12 Claims, 4 Drawing Figures a

METHOD FOR BONDING AN INSULATED WIRE ELEMENT ON A CONTACT

BACKGROUND OF THE INVENTION

1. Field of the Invention

The invention relates to a method for bonding a wire which is coated with an insulating lacquer layer, on a contact element. The invention relates in particular to a bonding method for electronic components, such as HF-inductor coils having a wire wound around a ceramic, plastic or ferrite core.

2. Description of the Related Art

In electrical components, such as relays or contactors, a continuing trend toward miniaturization requires that the inductor coils employed be made as small as possible. This means that the wires used in winding, have a very small diameter, as a result of which, the bonding of the coil ends becomes more difficult. As an example, the end of the coil may exhibit diameters in the order of 30 to 100 μm (0.03–0.1 mm). In German patent application No. P 34 33 692.3 (U.S. Ser. No. 761,288); a miniaturized HF-inductor of this type in chip form is disclosed. In this chip a lacquer insulated wire which may be wound in one or more layers, must be bonded to plate-like contact elements.

Until the present time, lacquer coil connections were bonded by manual, mechanized or fully automated soldering. Particularly in the case of high temperature lacquered wires, temperatures as high as 500° C. are necessary. Thus, the materials immediately adjacent to the soldering area may be damaged by the radiated heat.

Ultrasonic welding, in which the lacquer insulation layer is broken up and welding action is accomplished simultaneously, may be applied to advantage for bonding. However, problems arise in lacquer insulated wires less than 0.4 mm, since the wire is weakened at the point of attachment due to deformation. Since the mechanical requirements imposed cannot be met in general, it has been necessary until now, to weld with an additional small covering plate in order to improve the mechanical attachment. The foregoing is described specifically for laser welding in laid open German patent application No. 33 07 773. In the fabrication of HF-inductor coils, which are produced either with terminal leads, or more recently with terminal lugs as so-called HF-inductor-chips, this would mean higher cost, since the small covering plates must be handled prior to welding.

SUMMARY OF THE INVENTION

An object of the invention is to provide an improved method for bonding a thin lacquer insulated wire to a metallic support.

A more specific object of the invention is to provide a simple method for tear-safe bonding the lacquer insulated wire of an inductor chip.

These and other objects are achieved by a method for bonding a metallic wire coated with an insulated lacquer layer to a metallic contact element, which comprises the steps of: (a) applying ultrasonic energy to the wire so that the lacquer layer is broken up and the wire is deformed in a certain area and welded to the contact element; and (b) enclosing the entire area of deformation with an adhesive.

The method according to the invention is easily integrated into a production line in which the welding and associated cementing may be automated. The adhesive employed will preferably be a thixotropic substance which hardens rapidly.

The method according to the invention is particularly suitable for bonding HF-inductance coils which have wire wound ceramic, plastic or ferrite cores, are formed as inductor chips and are provided with large surfaced terminal lugs. In this case one end of the insulated wire is laid on the terminal lug of the inductor chip and than welded. Finally, the weld point is coated with an organic or inorganic adhesive. If the contact element of the inductor coil is a wire, the end of the coil wire is wound around the contact wire. Then, the coil wire is welded to the contact wire in close proximity to the end of the coil. Afterwards, the entire face area of the core surrounding the wires is coated with an organic or inorganic adhesive.

The invention utilizes the advantages of ultrasonic bonding of lacquered wires, such as secure connection and low temperature stress; and likewise the previous disadvantage of limited mechanical resistance is compensated for through the use of the adhesive. Such cementing materials are easily accommodated and may be applied to the weld locations in the form of drops. After hardening the adhesive is mechanically rigid, and especially, also resistant to temperature changes. The volume of the bonding agent drop can be selected so that the entire deformed area is enclosed. The result is that the strength of the bonding is greater than the strength of the wire.

When the method according to the invention is applied to electronic components, not only the required improvement in mechanical stability with concurrent simplification of fabrication is achieved; the components are protected against climatic and corrosive influences. Moreover, the location of the weld or the entire component can be covered with mechanically rigid coatings.

BRIEF DESCRIPTION OF THE DRAWINGS

Additional objects and advantages of the invention will become apparent from the following description of preferred embodiments of the invention as illustrated in the accompanying drawings.

FIGS. (**1*a*) and (1*b***) demonstrate the principle of the method of the present invention.

DETAILED DESCRIPTION OF PREFERRED EMBODIMENTS

Figure 1:
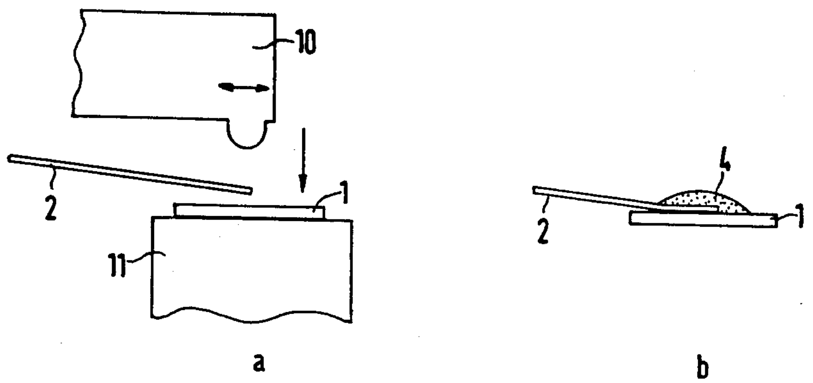

In FIG. 1*a*, there is shown a metallic support 1, for example a contact element on which a lacquer insulated wire 2 is to be bonded. Such a bond is advantageously created by ultrasonic welding for which an ultrasonic electrode (sonotrode) 10 and an associated ultrasonic anvil 11 are shown. In ultrasonic welding the insulation layer is destroyed by mechanical action and the metallic parts are bonded by friction welding and concurrent deformation.

Problems are likely to arise, when wires of diameters less than 0.4 mm are welded, since the deformed wire may shear off. When, in accordance with FIG. **1*b***, a drop of a suitable adhesive is applied after welding, the entire area in danger of shearing is protected and a secure mechanical connection is achieved. The adhesive could be a cement developed for bonding chips in surface-mounted-device (SMD)-technology.

It is advantageous particularly for wires under 100 μm in diameter, that wire 1 is first pre-deformed by pressuring sonotrode 10 against it and then exposed to the ultrasonic energy. In a typical example, the ultrasonic frequency is at 40 kHz, the pressure ranges between 2 and 10N and the power is up to a few watts.

In FIG. 1*b*, the adhesive is, for example, a single component cement. It is important for the intended use, that the cement is thixotropic, i.e. retaining its form, and hardening rapidly. In automated production a drop of the cement may then be quickly applied immediately after welding. The drop then hardens in a few seconds on passing under UV light, forming a shape 4 which seals the deformed area of wire 1.

Figure 2:
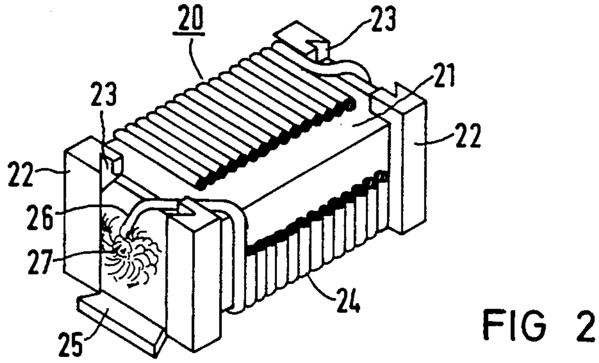
FIG. 2 is a perspective view of a novel HF-inductor chip having its coil wire bonded according to the invention.

FIG. 2 shows an HF-inductor designated 20. Such inductors usually comprise a core 21, that may be made of ceramic, plastic or ferrite, with a single or multi-layered winding of a round lacquer insulated wire 24. In miniaturization of these electronic components (for example, 3.2 mm×2.5 mm×1.5 mm and 40 μm wire for nomimal inductances of 0.068 to 8.2 μH at 2 MHz measuring frequency) it is now the practice to provide large surface contact elements rather than the terminal leads usually used in the past. To this end the core 21 exhibits front and rear surfaces 22 with grooves 23, into which terminal lugs 25 in the form of small flat plates are inserted. The terminal lugs 25 are bent at their free ends, in order to facilitate mounting on circuit boards and the like.

The terminal lug 25 must be bonded to the winding wire 24. To make this possible the winding wire 24 is laid diagonally over the terminal lug 25 and an end 26 of the winding wire 24 is attached, by means of ultrasonic welding, in the above described manner. Subsequently, a drop of the previously described adhesive is applied to the surface of terminal lug 25. A papillary area 27 is formed, that covers the entire deformation area of the ultrasonic weld. A mechanically stable connection is attained upon hardening of the adhesive.

Figure 3:
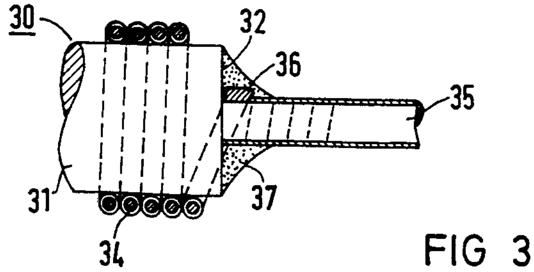
FIG. 3 is a cross-section of a conventional HF-inductor coil having its wire bonded to a contact wire according to the invention.

FIG. 3 shows a HF-inductor 30 having a ceramic, plastic or ferrite core 31 with a winding 34. At a front surface 32 of core 31 a terminal wire 35, which may be anchored in core 31, is brought out.

For bonding terminal wire 35 to winding wire 34, an end 36 of winding wire 34 is wound around wire 35 and ultrasonically welded to it immediately adjacent to the core 31. Afterwards, the entire region surrounding wires 35 and 36 are coated with an organic or inorganic adhesive. Upon hardening it may assume a spout-like form 37.

It has been demonstrated that through a combination of welding and cementing of thin lacquer insulated wires to the contact elements of components according to FIGS. 2 and 3, a strength is achieved that is greater than the strength of the wire. Measurements of contact resistance as well as temperature change and additional electrical tests showed acceptable values. Moreover, the weld area is protected against climatic and corrosive influences.

Having thus described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

We claim:

1. A method for bonding a metallic wire coated with an insulated lacquer layer to a metallic contact element, which comprises the steps of:

(a) applying ultrasonic energy to the wire so that the lacquer layer is broken up and the wire is deformed in a certain area and welded to the contact element; and (b) enclosing the entire area of deformation with an thixotropic adhesive.

2. A method for bonding a HF-inductance coil comprising a core and a wire coated with an insulating lacquer layer and wound around the core, to a contact element, comprising the steps of:

(a) applying ultrasonic energy to the wire so that the lacquer layer is broken up and the wire is deformed and welded to the contact element; and (b) enclosing the entire area of deformation with an thixotropic adhesive.

3. A method according to claim 1, wherein the contact element is a lug having a planar surface, comprising the step of placing an end of the wire on the lug before exposing it to ultrasonic energy.

4. A method according to claim 2, wherein the contact element is a terminal having a planar surface region, comprising the step of placing an end of the wire on the planar surface region before exposing it to ultrasonic energy.

5. A method according to claim 1, wherein the contact element is a terminal wire, comprising the step of wrapping an end of the wire around the terminal wire before exposing it to ultrasonic energy.

6. A method according to claim 2, wherein the contact element is a terminal wire, comprising the step of wrapping an end of the wire around the terminal wire before exposing it to ultrasonic energy.

7. A method according to claim 1, wherein the adhesive comprises inorganic material.

8. A method according to claim 2, wherein the adhesive comprises inorganic material.

9. A method according to claim 1, wherein the adhesive comprises organic material.

10. A method according to claim 2, wherein the adhesive comprises organic material.

11. A method according to claim 1, wherein the entire area of deformation is enclosed by applying a drop of the adhesive.

12. A method according to claim 2, wherein the entire area of deformation is enclosed by applying a drop of the adhesive.

* * * * *